March 7, 1961 C. D. GIBSON 2,973,878
MATERIAL HANDLING TRUCK
Filed June 24, 1957 6 Sheets-Sheet 1

INVENTOR.
CHRISTIAN D. GIBSON
BY

March 7, 1961

C. D. GIBSON 2,973,878

MATERIAL HANDLING TRUCK

Filed June 24, 1957

INVENTOR.
CHRISTIAN D. GIBSON
BY

March 7, 1961 C. D. GIBSON 2,973,878
MATERIAL HANDLING TRUCK
Filed June 24, 1957 6 Sheets-Sheet 3
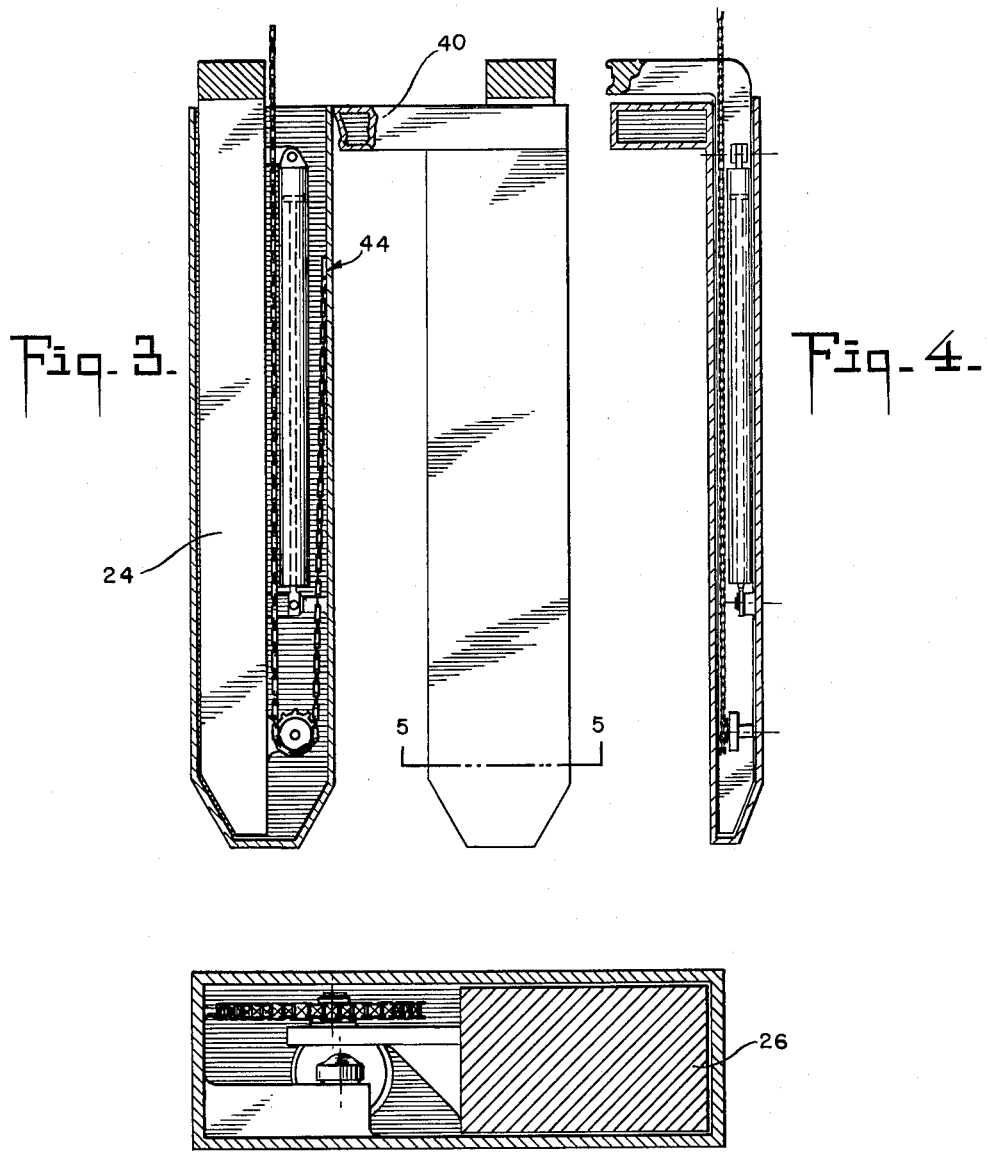
INVENTOR.
CHRISTIAN D. GIBSON
BY

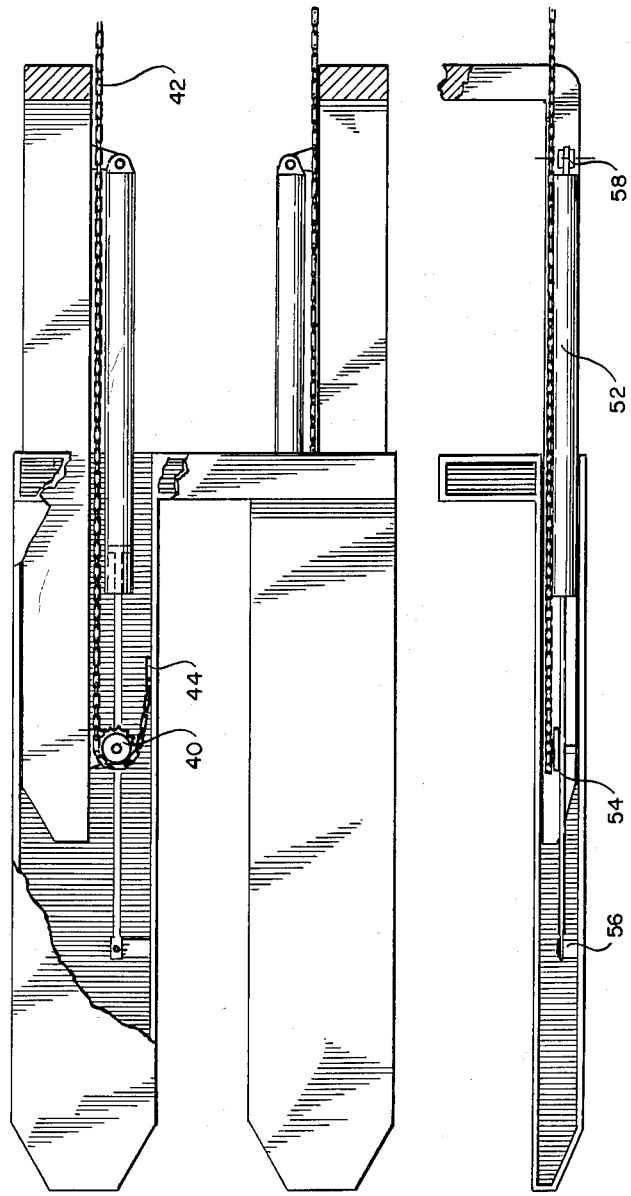

March 7, 1961  C. D. GIBSON  2,973,878
MATERIAL HANDLING TRUCK
Filed June 24, 1957  6 Sheets-Sheet 5
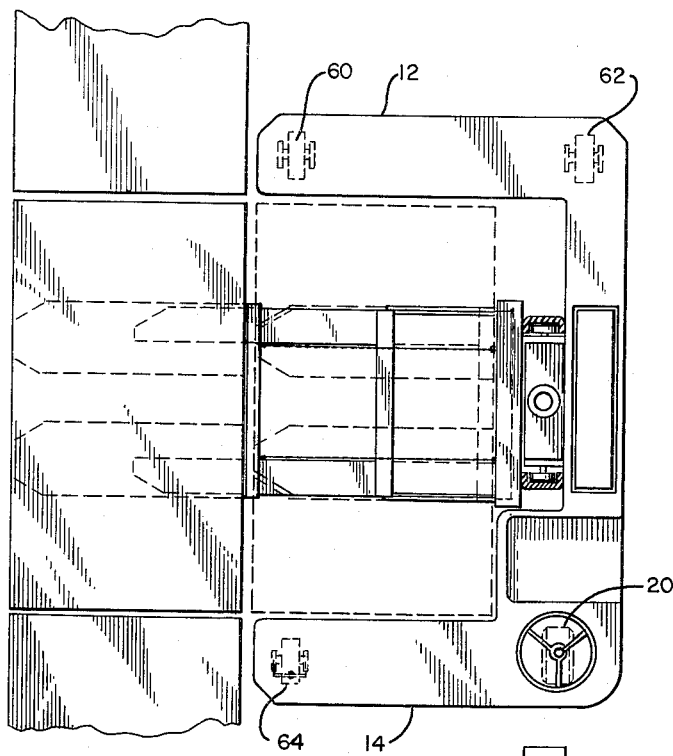
Fig_9_
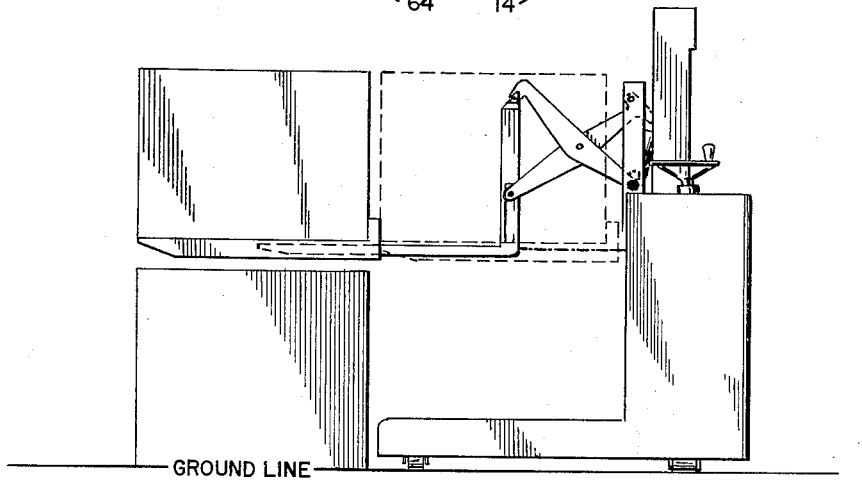
Fig_8_
INVENTOR.
CHRISTIAN D. GIBSON
BY

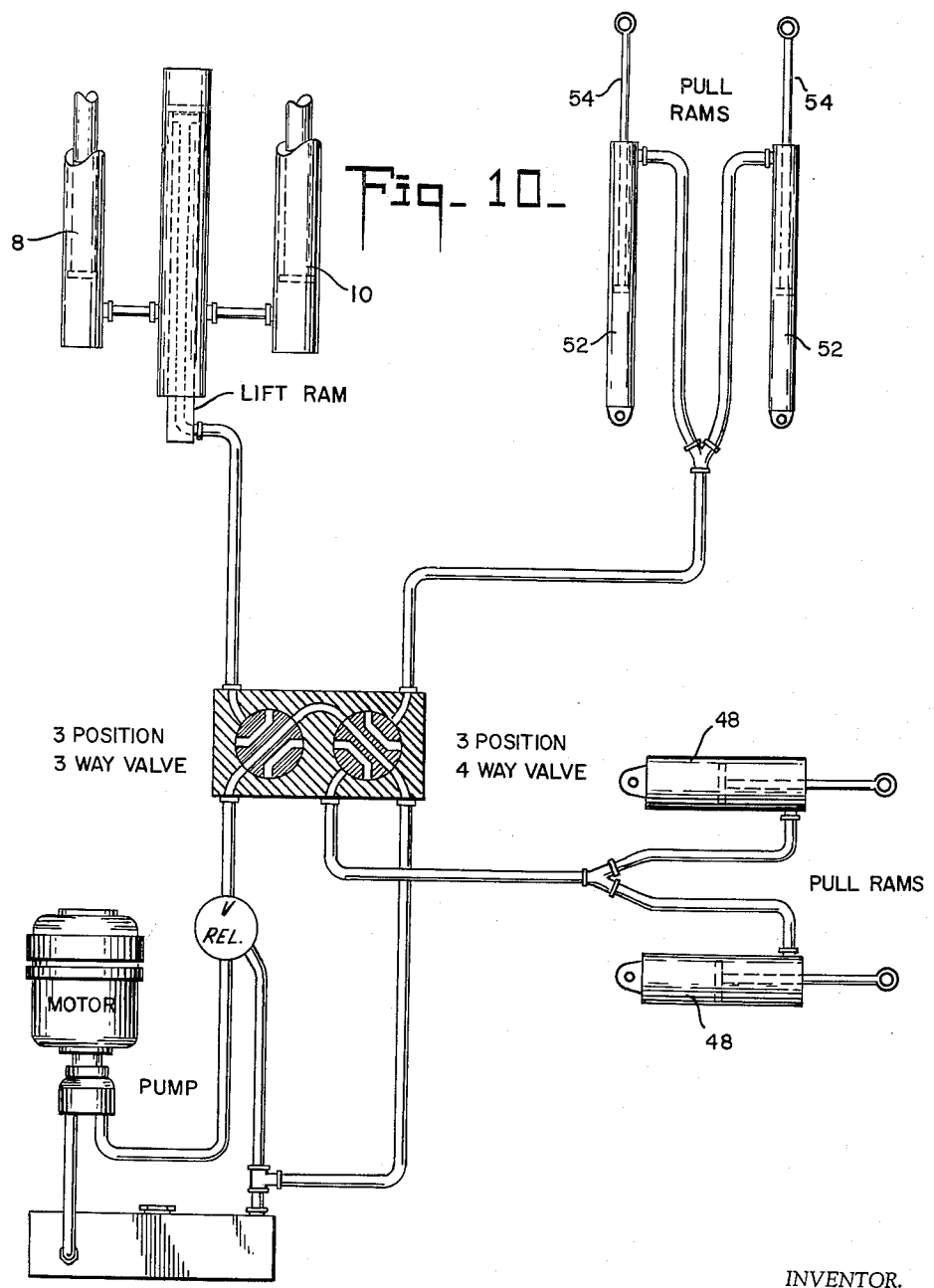

United States Patent Office 2,973,878
Patented Mar. 7, 1961

2,973,878

MATERIAL HANDLING TRUCK

Christian D. Gibson, Greene, N.Y., assignor to The Raymond Corporation, Greene, N.Y., a corporation of New York Filed June 24, 1957, Ser. No. 667,550

2 Claims. (Cl. 214—730)

This invention relates to material handling trucks and more particularly to material handling trucks of the type shown in U.S. Letters Patent 2,752,058 granted June 26, 1956.

In trucks of the type shown in the above-identified Letters Patent, the wheel supported base has thereon a mast, a carriage slidable up and down said mast and a projectable and retractable load support on said carriage, the wheel-supported base being usually forked to embrace the load support in its lowered position and to provide greater stability. In this truck the principal load supporting wheels are located well in front of the mast and the load support is projectable to pick up a load which is located in front of the supporting wheels and then to retract this load so that when fully retracted the vertically projected center of gravity of the load will lie within or not substantially outside the wheel base of the truck.

As set forth in the specification of the Letters Patent above identified, this truck has a wide field of utility and is capable of meeting most material handling situations that are likely to arise in such field. There are, however, some situations in which a truck having a greater reach than that disclosed in said Letters Patent would be particularly useful. Among them are the following:

(1) With this type of truck, it would sometimes be advantageous to project the load a greater distance beyond the load wheels than is now possible, as, for example, when the truck is used to charge a furnace or when it is employed for inserting into or removing dies from a press.

(2) If, in a truck having a projectable and retractable load carrier, such as the truck of said Letters Patent, it be desirable to have the load supporting wheels of its base located at a greater distance in front of the mast than in the patent disclosure, in order to provide increased stability, a greater projection or reach of the load carrier would be necessary if the load to be picked up be located in front of the said load wheels. An aim of the present invention is to provide for such increased projection or reach of the load carrier without increasing the overall length of the projecting and retracting linkage.

(3) When a truck of the general type of that shown in said Letters Patent above identified is used for side loading, it is important that the travel of the load carrier be substantially equal to the overall length of the load, in order to retract the load from a location completely outside the truck to a position completely within the truck.

The general object of the present invention is so to modify the construction of a truck of the load support projecting and retracting type, such as shown in said Letters Patent, that the overall projection or reach of the load support may be substantially increased or even doubled without increasing other dimensions of the truck or of the projecting or retracting linkage. More particularly the invention aims to provide a material handling truck, having a wheel-supported base with a mast thereon and a carriage slidable up and down said mast and having on said carriage a projectable and retractable load support, in which the load support is provided with a telescopable extension projectable on said load support to extend its length and retractable thereon into telescoped relation thereto and providing means for effecting the projection and retraction of said load support and, synchronously therewith, the projection and retraction of the telescopable load support extension.

Other objects, advantages, and important features of the invention, to which reference has not hereinabove been directed, will appear hereinafter when the following specification and claims are considered in connection with the accompanying drawings in which:

Figure 3 is a plan view, with parts broken away to show parts otherwise concealed, of a load supporting fork having the telescopable extensions which constitutes the principal subject matter of the present invention.

Figure 4 is a longitudinal section through one of the fork members shown in Figure 3, this figure showing relative locations of the elements which effect the projection and retraction of the telescopable extension of the fork member.

Figure 5 is a section on the line 5—5 of Figure 3.

Figure 6 is a plan, similar to Figure 3, but showing the telescopable extension of the load support in its extended position.

Figure 7 is a section similar to Figure 4, the telescopable extension of the load support being in its extended position.

Figure 8 is an elevation similar to Figure 2 but showing the truck with a modified arrangement of the supporting wheels whereby the truck may readily be steered in the direction permit side delivery of the load.

Figure 9 is a plan view of the truck shown in Figure 8.

Figure 10 is a diagrammatical view showing the layout of the hydraulic system through which the extension and retraction of the load support and of its telescopable extensions are brought about.

Figure 1:
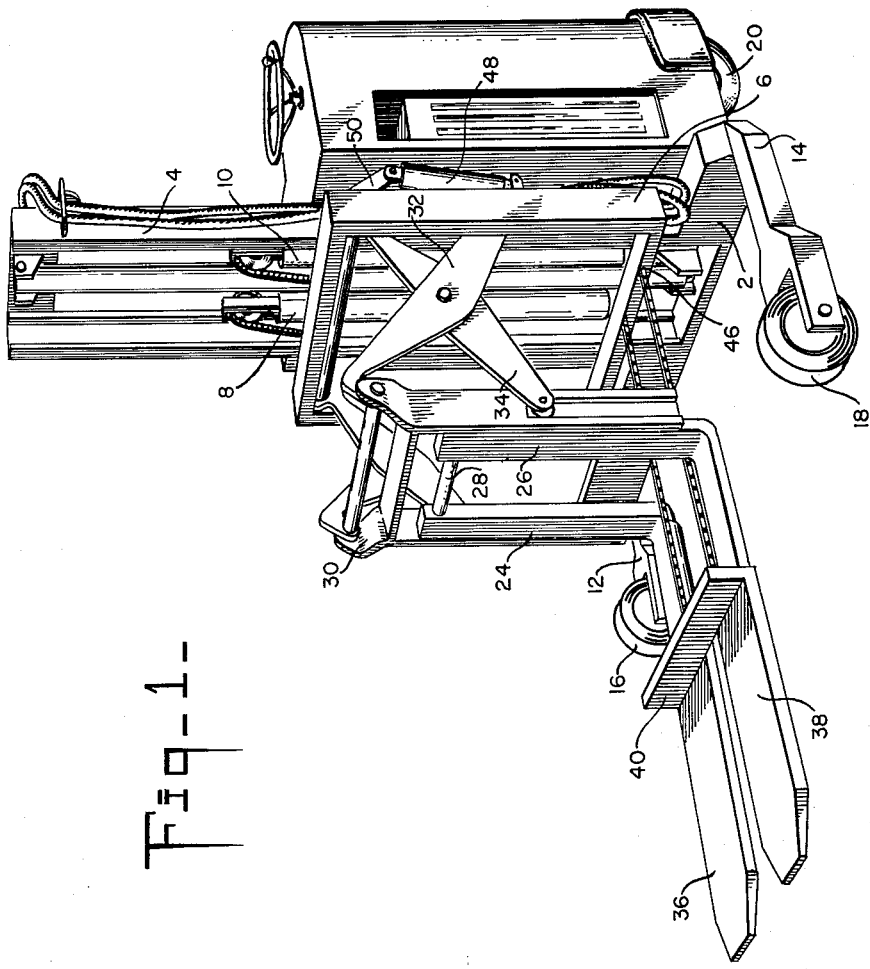
Figure 1 is a perspective view of a truck such as shown in the Letters Patent 2,752,058 hereinabove referred to having the present invention incorporated therein.

As hereinabove pointed out, the present invention is shown as incorporated in a material handling truck such as that disclosed in U.S. Letters Patent 2,752,058 to which patent reference may be had for a more detailed description of parts shown but not fully described herein. As set forth in said Letters Patent, the truck to which the present invention is applied comprises a wheel-supported base 2 having thereon a mast 4 on which is slidably mounted a carriage 6 which is operated to lift or lower the load to be handled by connections to hydraulic rams or jacks 8 and 10. The base 2 preferably comprises a forked forward extension, at the front ends of the fork members 12 and 14 of which are mounted two of the base supporting wheels, respectively 16 and 18. The other base supporting wheels, as set forth in said Letters Patent, comprise a swivel-mounted driving and steering wheel 20 and a swivel-mounted caster wheel 22, the last mentioned base supporting wheels being preferably located on opposite sides of the axis of symmetry of the wheel-supported base.

The primary load support comprises the L-shaped fork members 24 and 26 having their vertical arms pivotally mounted upon a supporting shaft 28 in a frame 30 which in turn is supported from the carriage 6 by a scissors type linkage, comprising outer and inner pairs of cross-connected scissors links 32 and 34 constituting means for projecting and retracting the frame 30 away from and toward the carriage 6 and thus projecting and retracting the fork members 24 and 26 for the purposes more fully set forth in said Letters Patent above identified. It will be seen that in the retracted position of the load support the scissors links 32 and 34 and the frame 30 on which the fork members are carried will be nested within the framework of the carriage 6, thus permitting the retracted load to be pulled back to a position in which its vertically projected center of gravity will lie either within or not substantially outside the wheel base of the truck, all as more fully set forth in the patent above referred to.

As set forth in the statement of invention hereinabove, there are material handling situations in which it is desirable to provide for a greater projection of the load support than is provided merely by the scissors linkage which is herein shown and which is an important feature of the patent above referred to. If such increased projection were to be obtained merely by lengthening the scissors arms of the scissors linkage it will be seen that this would result in a vertical lengthening not only of the carriage 6 but of the frame 30 to provide for the increased swing or range of movement of the lengthened scissors arms. Such vertical lengthening or increase in the collapsed height of the projecting and retracting mechanism would obviously be objectionable. It is to obviate such objectionable increase in the dimensions of the scissors linkage and yet obtain all of the advantages of an increased range of projection or increased reach of the load support that the present invention has been devised.

As shown in the drawings, each of the fork members 24 and 26 of the load support has been provided on its horizontal or normally load engaging part with a telescopable extension. These two telescopable extensions, respectively 36 and 38, are preferably rigidly cross-connected by a cross bar 40 which also serves as a rear abutment for the load to be handled by the load support. In Figures 1, 2, 6, 7, 8, and 9 the fork extensions 36 and 38 are shown in their extended relation to the fork members 24 and 26, this extended relation substantially doubling the normal reach of the load support fork members 24 and 26, as shown.

It will be seen that when the extension members 36 and 38 are in their telescoped relation to the fork members 24 and 26 the load support is substantially equivalent to the load support of the truck of the patent above referred to and that the truck with the extension members in their retracted or telescoped position requires for its manipulation substantially the same space as the truck of said patent.

To effect the projection and retraction of the telescopable extension members 36 and 38 synchronously with the projection and retraction of the fork members 24 and 26 by means of the scissors linkage, the arrangement shown in Figures 3, 4, 5, 6 and 7 taken in connection with Figure 1 is provided. From an inspection of these figures it will be seen that there is mounted upon each of the fork members 24 and 26 a pulley 40, here shown as a sprocket wheel, over which passes a sprocket chain 42 anchored at its outer end at 44 to the telescopable extension and at its inner end to the carriage 6, as shown at 46. There is preferably one of these pulleys or sprockets and one of these sprocket chains operating upon each of the telescopable extensions 36 and 38. It will be seen that this arrangement is such that when the fork members 24 and 26 are projected by means of the scissors linkage as shown in Figure 1, the resulting projection with the fork member of the sprocket wheel 40 will exert a pull on the sprocket chain 42 and by reason of its anchoring to the carriage 6 at one end and its anchoring to the telescopable extension on each fork member at its outer end will cause the extensions to be projected forwardly on the fork members 24 and 26 until they are in the positions shown in Figures 6 and 7.

Figure 2:
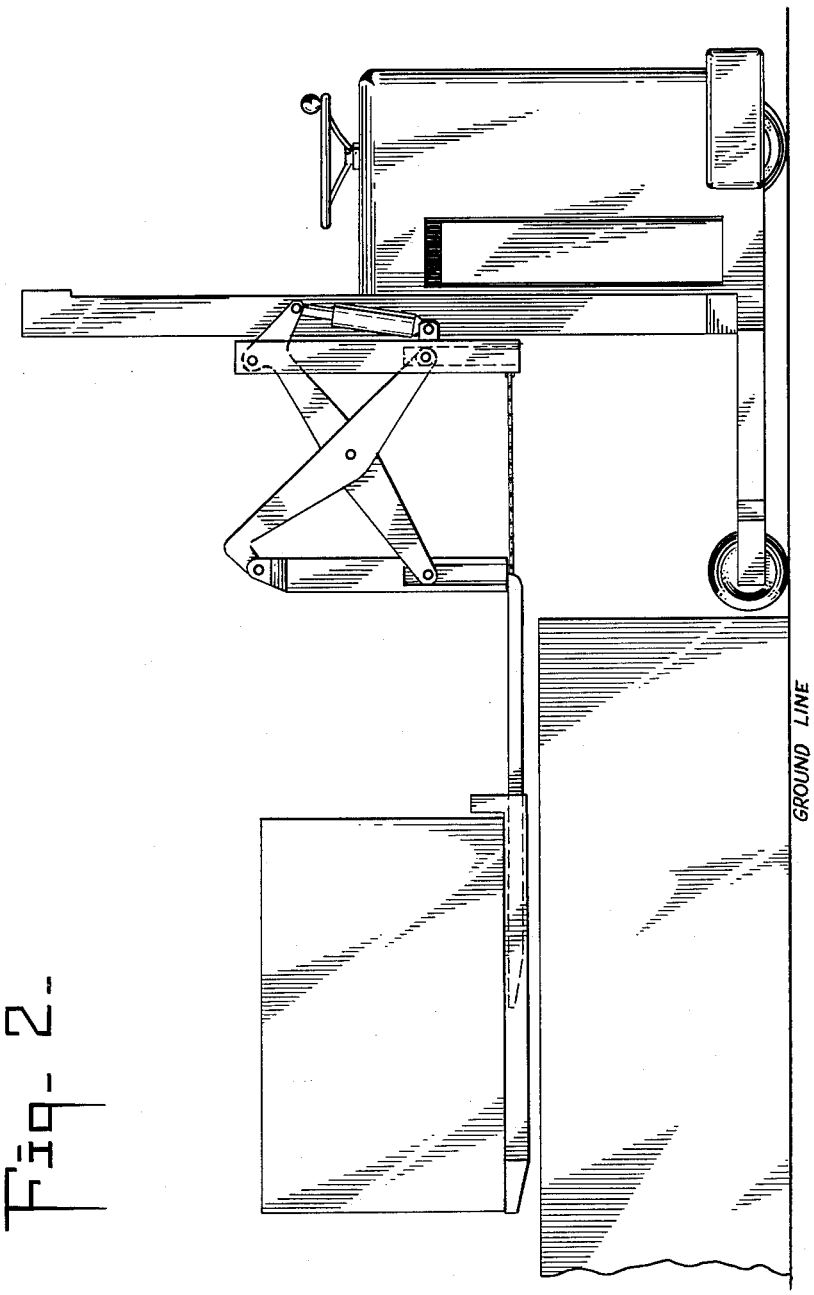
Figure 2 is a side elevation of the truck shown in Figure 1, this view showing the truck with its load support and the telescopable extension thereon in their fully extended load pick-up or delivery position, with a load thereon.

Instead of using a 2-way hydraulic ram or jack to effect the projection and retraction of the work support by means of the scissors linkage, as in the patent hereinabove referred to, provision is made in the truck of the present invention for using two 1-way jacks for effecting the projection and retraction of the load support. As shown in Figures 1, 2, and 10 a 1-way hydraulic jack 48 is connected to each bellcrank arm 50 on the inner scissors linkage 34 and serves to rock this scissors linkage in the load support projecting direction. This projecting movement by the jack 48 effects the projection of the extension members 36 and 38, as hereinabove set forth, and serves at the same time to withdraw from its cylinder 52 a piston rod 54 which is connected to a pivot-carrying block 56 attached to the lower wall of the telescopable extension, there being one of these cylinders, pistons, and connections for each of the telescopable extensions 36 and 38. At its base end the cylinder 52 is anchored to the associated fork members 24 or 26, as shown at 58.

From the foregoing description it will be seen that when the extension members 36 and 38 are in their extended or projected positions, shown particularly in Figures 6 and 7, and the scissors linkage is in its load support projecting position, shown in Figure 1, if the hydraulic fluid be introduced into the cylinder 52 to cause the retraction of the piston therein, not shown, connected to the piston rod 54, the pull on the connection 56 between the piston rod 54 and the associated extension member 36 or 38 will cause the extension member to move rearwardly toward the frame 30. This telescoping movement of the extension member on the associated fork member will move the anchor 44 of the chain 42 rearwardly thus exerting a pull on the sprocket wheel 40, which pull, by reason of the fact that the other end of the chain 42 is anchored on the carriage 6, will start a rearward movement of the load support fork members 24 and 26 and a similar movement of the frame 30 in which they are mounted thus causing a closing movement of the scissors or lazy tongs linkage 32 and 34. When this movement of each of the piston rods 54 has been completed, as shown in Figures 6 and 7, both being subjected to the same hydraulic pressure simultaneously, not only will the extension members 36 and 38 be brought into their telescoped relation to the fork members 24 and 26 but the scissors linkage will also be completely collapsed and nested within the frame of the carriage 6 thus causing the truck to have substantially the load support retracted appearance of the truck of said Letters Patent in which the invention has been incorporated.

The hydraulic hookup of the hydraulic rams which effect the projection and retraction of the load support, as hereinabove set forth, and also the load lifting and lowering movements of the carriage, is shown in somewhat greater detail in Figure 10 of the drawings together with the control valves and connections, not shown in the other figures of the drawings, through which the operation of the jacks or rams may be brought about and controlled. From the corresponding reference numerals placed on Figure 10, it is believed that the operation of the rams will be apparent and that further detailed description of what is shown in Figure 10 will not be necessary.

In Figures 8 and 9 the truck of the present invention is shown as modified for side delivery. For convenience in manipulating the truck for side delivery, especially in the narrow aisles of storage warehouses, it will be seen that a different mounting of the base-supporting wheels is desirable, so that the truck can be driven in a direction at right angles to the direction of drive of the truck shown in Figures 1 and 2. Instead of the wheels 16 and 18 which, in Figure 1, are mounted on the base fork members 12 and 14 to rotate in planes parallel to the direction of projection and retraction of the load support, the truck shown in Figures 8 and 9 has two base-supporting wheels 60 and 62 mounted as shown to rotate in planes at right angles to the direction of projection and retraction of the load support, a caster wheel 64 being provided near the outer end of base fork member 14 to permit the driving and steering of this modified truck by means of its driving and steering wheel 20.

When a truck embodying the present invention has the base-supporting wheels arranged as just described and as shown in Figures 8 and 9, it will be seen that it can readily be manipulated into position, as shown in Figure 9, either to pick up or deposit a load and that the telescopable extension members 36 and 38, when fully retracted, will support the pick-up load in a position completely within the truck. In other words, as shown in Figure 8 the truck of the present invention, when thus modified for use as a side delivery truck, can completely support and completely retract the load from a location completely outside the truck to a position completely within the truck, this last mentioned position being indicated on dotted lines in Figure 8.

What I claim as new is:

1. In a material handling truck, the combination with a wheel-supported base having a mast thereon and a carriage slidable up and down said mast and having thereon a projectable and retractable load support, a telescopable extension on the load support projectable thereon to extend its length and retractable thereon into telescoped relation thereto, and means for effecting the projection and retraction of said load support and, synchronously therewith, the projection of the telescopable load support extension, said means including a flexible connecting member and a pulley wheel, said pulley wheel being mounted on said load support, one end of said flexible connecting member being anchored to the carriage of said material handling truck and said connecting member being passed about said pulley wheel and the other end of said member anchored to said telescopable extension at a point on said extension and between said pulley and said carriage, whereby a projection of said load support imparts a similar and synchronous motion to said telescopable extension.

2. In a material handling truck, the combination with a wheel-supported base having a mast thereon and a carriage slidable up and down said mast and having thereon a projectable and retractable load support, a telescopable extension on the load support projectable thereon to extend its length and retractable thereon into telescoped relation thereto, and means for effecting the projection and retraction of said load support and, synchronously therewith, the projection and retraction of the telescopable load support extension, said means for projecting and retracting the load support and the telescopic load support extension comprises a first jack mounted on said carriage, a flexible connecting member, a pulley wheel, and a second jack mounted on said load support, said first jack being connected to said load support, said pulley wheel being mounted on said load support, and one end of said flexible connecting member being anchored to the carriage and said member being passed about said pulley wheel and the other end of said member being attached to the telescopic extension at a point between said pulley wheel and said carriage, the second jack being mounted on said load support and connected to the telescopic extension, said means being interconnected whereby said first jack serves to effect the projection of the load support and synchronous therewith the projection of the telescopic extension and said second jack serves to effect the retraction of said telescopic extension and sychronous therewith the retraction of said load support.

References Cited in the file of this patent

UNITED STATES PATENTS

| | | |
|---|---|---|
| 1,903,431 | Abbe | Apr. 11, 1933 |
| 2,752,058 | Gibson | June 26, 1956 |
| 2,819,811 | Quayle | Jan. 14, 1958 |